United States Patent
Zhao et al.

(10) Patent No.: US 10,291,902 B2
(45) Date of Patent: May 14, 2019

(54) THREE-DIMENSIONAL CAMERA ASSEMBLY, TERMINAL APPARATUS AND RANGING METHOD

(71) Applicant: BOE Technology Group Co., Ltd., Beijing (CN)

(72) Inventors: Xingxing Zhao, Beijing (CN); Xinxin Mou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 414 days.

(21) Appl. No.: 14/608,495

(22) Filed: Jan. 29, 2015

(65) Prior Publication Data
US 2016/0212408 A1    Jul. 21, 2016

(30) Foreign Application Priority Data

Jan. 15, 2015    (CN) .......................... 2015 1 0020530

(51) Int. Cl.
*G01B 11/02* (2006.01)
*G03B 35/10* (2006.01)
(Continued)

(52) U.S. Cl.
CPC ......... *H04N 13/239* (2018.05); *G01B 11/026* (2013.01); *G01B 11/245* (2013.01); *G03B 35/10* (2013.01)

(58) Field of Classification Search
None
See application file for complete search history.

(56) References Cited

U.S. PATENT DOCUMENTS 6,118,475 A * 9/2000 Iijima .................... G01C 11/06
                                                                             348/42
8,908,054 B1    12/2014 Koenck et al.
(Continued)

FOREIGN PATENT DOCUMENTS

CN         1798958 A      7/2006
CN      102792333 A     11/2012
(Continued)

OTHER PUBLICATIONS

Krotov, E., et al., "Stereo Ranging with Verging Cameras", 8180 IEEE Transactions on Pattern Analysis and Machine Intelligence, No. 12, New York (1990) ("Krotov").*
(Continued)

*Primary Examiner* — Willliam C Vaughn, Jr.
*Assistant Examiner* — Lindsay J Uhl
(74) *Attorney, Agent, or Firm* — Banner & Witcoff, Ltd.

(57) ABSTRACT

Embodiments of the present invention provide a three-dimensional camera assembly, a terminal apparatus and a ranging method. The three-dimensional camera assembly comprises: a substrate; a first camera and a second camera, mounted on the substrate and facing a first direction, wherein first and second optical axes of the first and second cameras are oblique with respect to a connection line between lens centers of the first and second cameras, the first optical axis has a first included angle with respect to the connection line, the second optical axis has a second included angle with respect to the connection line, and at least one of the first included angle and the second included angle is not 90°.

18 Claims, 11 Drawing Sheets

(51) Int. Cl.
  *G01B 11/245* (2006.01)
  *H04N 13/239* (2018.01)

(56) References Cited

U.S. PATENT DOCUMENTS

| | | | | |
|---|---|---|---|---|
| 9,736,344 | B2* | 8/2017 | Lim | H04N 5/2253 |
| 2001/0030682 | A1* | 10/2001 | Tserkovnyuk | G03B 35/08 |
| | | | | 348/47 |
| 2003/0090753 | A1* | 5/2003 | Takeyama | G02B 5/04 |
| | | | | 359/15 |
| 2004/0061848 | A1* | 4/2004 | Kanemitsu | H04N 5/74 |
| | | | | 356/152.1 |
| 2009/0135247 | A1* | 5/2009 | Busse | H04N 5/2252 |
| | | | | 348/46 |
| 2010/0097443 | A1 | 4/2010 | Lablans | |
| 2010/0165155 | A1* | 7/2010 | Chang | H04N 5/2254 |
| | | | | 348/262 |
| 2013/0229529 | A1* | 9/2013 | Lablans | H04N 5/23238 |
| | | | | 348/169 |
| 2014/0300777 | A1* | 10/2014 | Koziol | G06K 7/10722 |
| | | | | 348/231.6 |

FOREIGN PATENT DOCUMENTS

| | | |
|---|---|---|
| CN | 103119515 A | 5/2013 |
| JP | 2012227679 A | 11/2012 |
| WO | 2008155961 A1 | 12/2008 |

OTHER PUBLICATIONS

Krotov, E., et al., "Stereo Ranging with Verging Cameras", 8180 IEEE Transactions on Pattern Analwiysis and Machine Intelligence, No. 12, New York (1990).*
X. Shanben, Photography Thechnique, Mar. 31, 2001, p. 48.
Shi Shunxiang, et al., Physical Optics and Applied Chemistry, Jul. 31, 2014, p. 471.
Oct. 8, 2016—(CN) Second Office Action Appn 201510020530.7 with English Tran.
Feb. 26, 2016—(EU)—Extended European Search Report Appn 15155512.5.
Mar. 2, 2016—(CN)—First Office Action Appn 201510020530.7 with English Tran.
Dec. 1, 1990—Krotkov, et al, "Stereo Ranging With Verging Cameras", IEEE Transactions on Pattern Analysis and Machine Intelligence, IEEE Computer Society, USA, vol. 12, No. 12, pp. 1200-1205.
Sep. 23, 1993—Woods, et al "Image Distortions in Stereoscopic Video Systems", Optomechatronic Micro/Nano Devices and Components III : Oct. 8-10, 2007, Lausanne, Switzerland, vol. 1915, pp. 1-13, downloaded from <http://www.curtin.edu.au/cmst>.
Apr. 1, 2012—Lau, "Leading Edge Views: 3-D Imaging Advances Capabilities of Machine Vision: Part I—Vision Systems Design", XP055249233, Retrieved from the Internet: URL:http://www.vision-systems.com/articles /print/volume-17/issue-4/departments/leading-edge-views/3-d-imaging-advances-capabilities-of-machine-vision-part-i.html [retrieved on Feb. 11, 2016], pp. 1-7.
Jan. 22, 2018—(EP) Office Action Appn 15155512.5.

* cited by examiner

THREE-DIMENSIONAL CAMERA ASSEMBLY, TERMINAL APPARATUS AND RANGING METHOD

This application claims priority to Chinese Patent Application No. 201510020530.7, filed on Jan. 15, 2015. The present application claims priority to and the benefit of the above-identified application and is incorporated herein in its entirety.

TECHNICAL FIELD

Embodiments of the present invention relate to a three-dimensional camera assembly, a terminal apparatus and a ranging method.

BACKGROUND

In recent years, a stereoscopic vision technology has been widely applied in the fields such as mobile robot navigation, smart car navigation, three-dimensional reconstruction and precision measurement, and it is the most important distance sensing technology in a computer passive ranging method. A basic principle of stereoscopic vision ranging is to observe the same object at two viewing points so as to obtain perceived images from different viewing angles, and then a position deviation (i.e. a parallax) between pixels of the images is calculated based on a triangulation principle in order to obtain distance information of the object.

In the stereoscopic vision ranging technology, a dual-camera based binocular stereoscopic vision ranging technology is a key technology, which determines positions of the same object on two different imaging pictures by using dual cameras, so as to obtain a distance of the object.

For the binocular stereoscopic vision ranging, a depth is calculated based on a depth of field, and the farther the object, the lower the resolution. FIG. 1 shows a relationship between an identification distance and a ranging accuracy of a binocular stereoscopic vision device (with a binocular distance of 12 cm), wherein a horizontal axis represents a distance between a camera and an object, and a vertical axis represents a distance represented by unit data (for example, 1) under the distance. As shown in FIG. 1, the larger the distance between the camera and the object, the larger the distance represented by the unit data, that is, the lower the ranging accuracy. In practice, in order to improve a distant ranging accuracy, it is usually necessary to increase the distance between the two cameras; however, the larger the distance between the two cameras, the greater a space occupied by the binocular ranging device, which inevitably increases a volume of a terminal apparatus accommodating the binocular ranging device, and is disadvantageous to obtain a miniaturized and ultra-thin terminal apparatus.

SUMMARY

Embodiments of the present invention provide a three-dimensional camera assembly, a terminal apparatus and a ranging method, which can enhance a ranging accuracy for a distant object in a case where a small interval is kept between cameras.

In one aspect, an embodiment of the present invention provides a three-dimensional camera assembly, comprising: a substrate; a first camera, mounted on the substrate and facing a first direction; a second camera, mounted on the substrate and facing the first direction, wherein a first optical axis of the first camera and a second optical axis of the second camera are oblique with respect to a connection line between a lens center of the first camera and a lens center of the second camera, the first optical axis has a first included angle with respect to the connection line, the second optical axis has a second included angle with respect to the connection line, and at least one of the first included angle and the second included angle is not 90°.

In another aspect, an embodiment of the present invention further provides a terminal apparatus, comprising: the three-dimensional camera assembly as described above.

In a further aspect, an embodiment of the present invention further provides a ranging method, comprising: capturing images of a object to be ranged by using a first image pickup device and a second image pickup device, respectively; determining a vertical distance h from the object to be ranged to a connection line between a lens center of the first image pickup device and a lens center of the second image pickup device, according a coordinate difference $\Delta x$ or $\Delta y$ between a first image point and a second image point of the object to be ranged formed in the first image pickup device and the second image pickup device, wherein the first image pickup device and the second image pickup device face the same direction, and a first optical axis of the first image pickup device and a second optical axis of the second image pickup device are oblique with respect to the connection line between the lens center of the first image pickup device and the lens center of the second image pickup device, the first optical axis has a first included angle with respect to the connection line, and the second optical axis has a second included angle with respect to the connection line, and at least one of the first included angle and the second included angle is not 90°.

BRIEF DESCRIPTION OF THE DRAWINGS

In order to clearly illustrate the technical solution of the embodiments of the present invention, the drawings of the embodiments will be briefly described in the following; it is obvious that the described drawings are only related to some embodiments of the present invention and thus are not limitative of the present invention.

DESCRIPTION OF THE EMBODIMENTS

Figure 1:
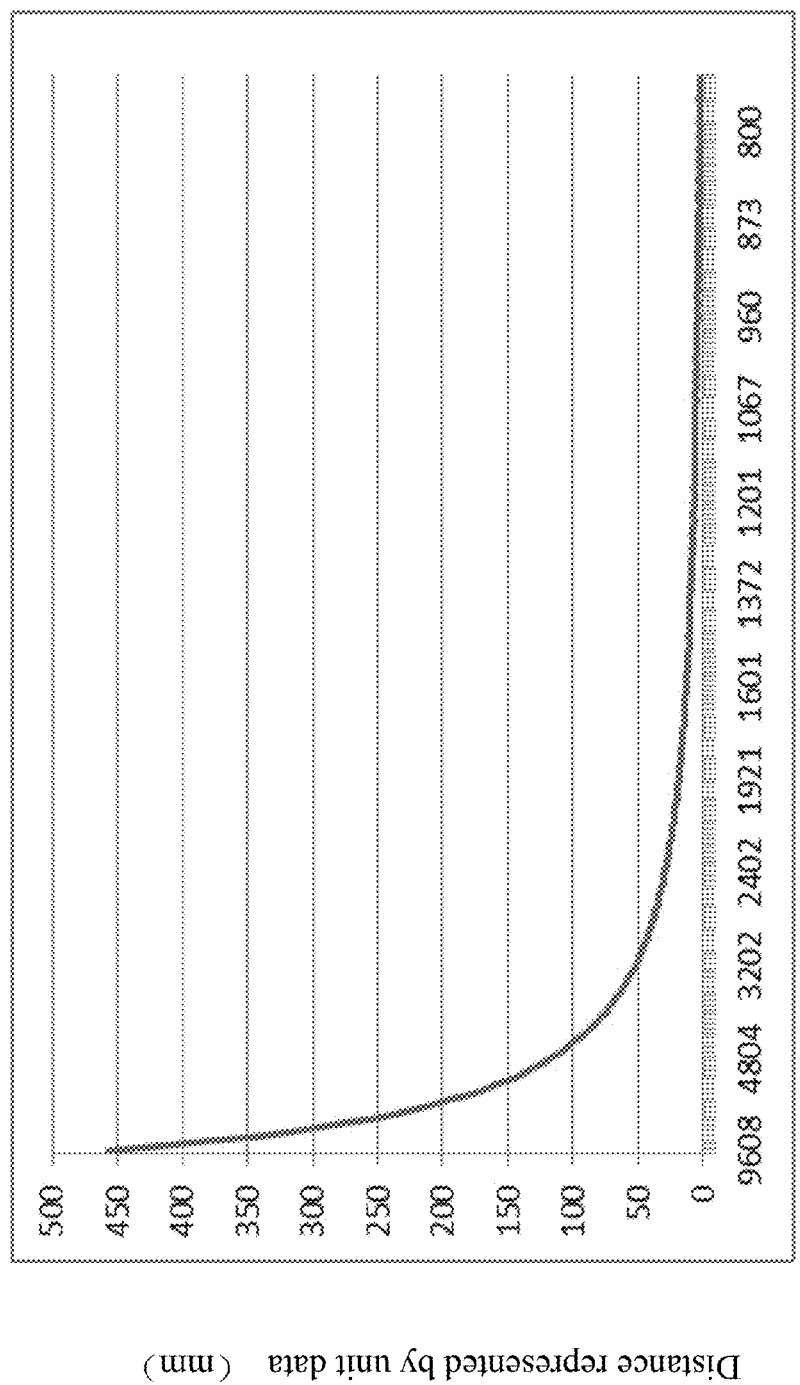
FIG. 1 shows a relationship between an identification distance and a ranging accuracy of a binocular stereoscopic vision device.

In order to make objects, technical details and advantages of the embodiments of the present invention apparent, the technical solutions of the embodiment will be described in a clearly and fully understandable way in connection with the drawings related to the embodiments of the present invention. It is obvious that the described embodiments are just a part but not all of the embodiments of the present invention. Based on the described embodiments herein, those skilled in the art can obtain other embodiment(s), without any inventive work, which should be within the scope of the present invention.

Unless otherwise defined, the technical terms or scientific terms here should be of general meaning as understood by those ordinarily skilled in the art. In the present disclosure, words such as "first", "second" and the like do not denote any order, quantity, or importance, but rather are used for distinguishing different components. Likewise, words such as "one", "a/an" or "the" or the like do not denote quantitative limitation, but rather indicate there is at least one. Words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but may include electrical connection, either direct or indirect. Words such as "up", "down", "left", "right" and the like are only used for expressing relative positional relationship, when the absolute position is described object is changed, the relative positional relationship may also be correspondingly changed.

Embodiments of the present invention provide a three-dimensional camera assembly, a terminal apparatus using the three-dimensional camera assembly, and a ranging method using the three-dimensional camera assembly.

The three-dimensional camera assembly comprises: a substrate; a first camera, mounted on the substrate and facing a first direction; a second camera, mounted on the substrate and facing the first direction, wherein a first optical axis of the first camera and a second optical axis of the second camera are oblique with respect to a connection line between a lens center of the first camera and a lens center of the second camera, the first optical axis has a first included angle with respect to the connection line, and the second optical axis has a second included angle with respect to the connection line, at least one of the first included angle and the second included angle is not 90°.

It should be noted that, in embodiments of the present invention, both cameras face the first direction, where the facing the first direction refers to "towards a direction of an object being shot", exemplarily, if the object being shot is located in front of the three-dimensional camera assembly, the facing the first direction refers to facing the front, and the facing the direction of the object being shot or facing the front do not mean that the optical axes of the two cameras are parallel, but the optical axes of the two cameras may not be parallel, as long as the object located in the front can be shot, and it may be defined as that the two cameras face the first direction as long as the two cameras are set to be able to shoot the same object.

In the camera assembly, the first camera and the second camera are disposed obliquely, without facing towards directly the front, so that a parallax between images formed by the same object in the two cameras can be enlarged, and thereby, the ranging accuracy for a distant object can be enhanced. Further, in embodiments of the present invention, in a case where a distance between the two cameras is kept as being small, the ranging accuracy for the distant object can be enhanced, and in a case where a size of the three-dimensional camera assembly is not increased, the ranging accuracy can be improved, which is favorable for achieving a miniaturized and ultra-thin terminal three-dimensional camera assembly and a miniaturized and ultra-thin terminal apparatus accommodating the three-dimensional camera assembly and can enhance portability.

Hereinafter, the three-dimensional camera assembly, the terminal apparatus using the three-dimensional camera assembly, and the ranging method using the three-dimensional camera assembly provided by the embodiments of the present invention will be described in detail in conjunction with the accompanying drawings.

Figure 2:
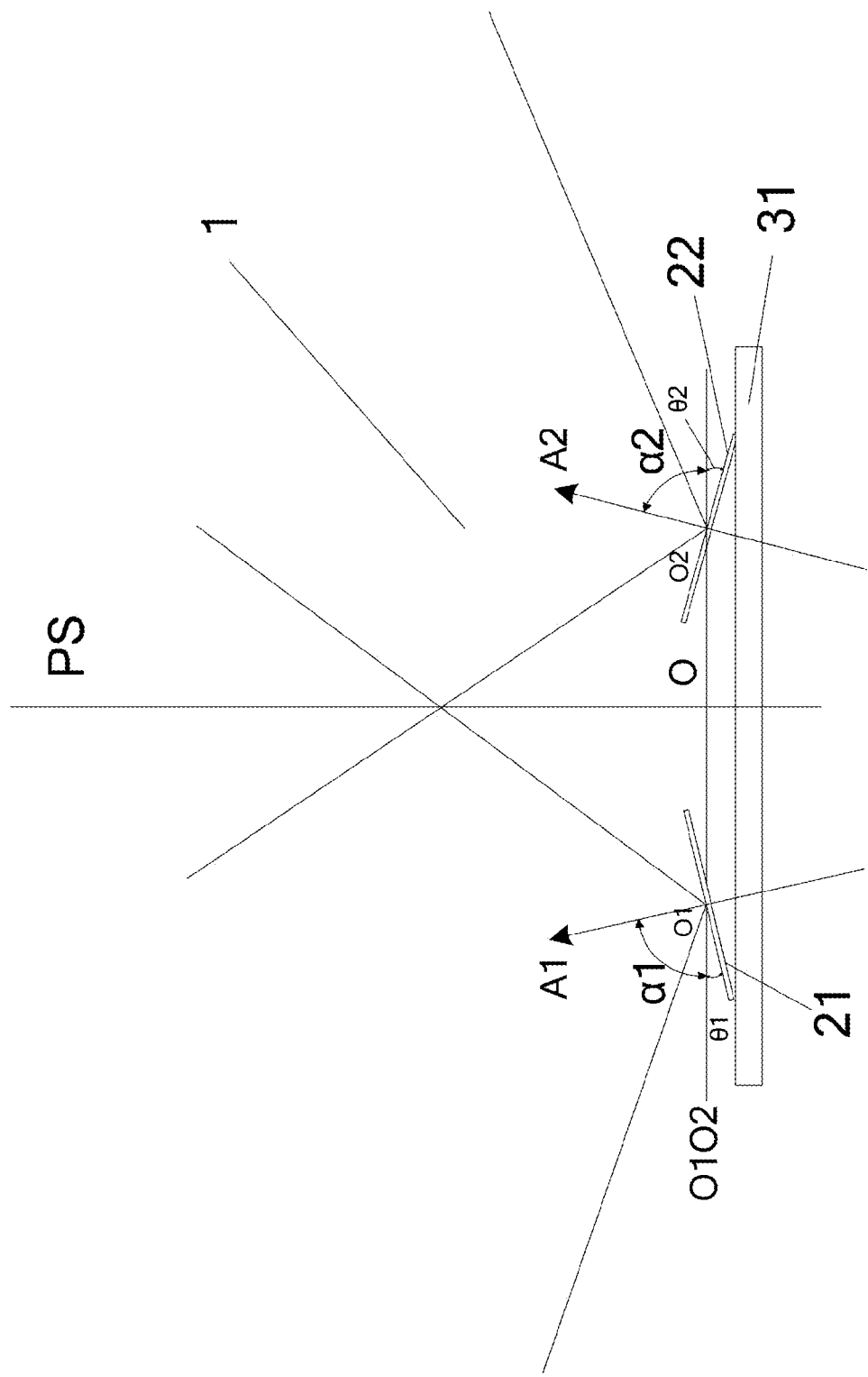
FIG. 2 shows a structural schematic diagram of a three-dimensional camera assembly according to an embodiment of the present invention.

An embodiment of the present invention provides a three-dimensional camera assembly, and FIG. 2 shows a structural schematic diagram of the three-dimensional camera assembly. As shown in FIG. 2, a three-dimensional camera assembly 1 comprises: a substrate 31; a first camera 21, mounted on the substrate 31 and facing a first direction (i.e., the front); a second camera 22, mounted on the substrate 31 and facing the first direction, wherein a first optical axis A1 of the first camera 21 and a second optical axis A2 of the second camera 22 are oblique with respect to a connection line O1O2 between a lens center O1 of the first camera 21 and a lens center O2 of the second camera 22, instead of facing towards directly the front which is perpendicular to the connection line.

Here, the first camera 21 has a first inclination angle $\theta 1$ with respect to the connection line O1O2, and the second camera 22 has a second inclination angle $\theta 2$ with respect to the connection line O1O2, and at least one of the first inclination angle $\theta 1$ and the second inclination angle $\theta 2$ is equal to 0°. FIG. 2 shows a case in which the first inclination angle $\theta 1$ and the second inclination angle $\theta 2$ are not 0° and are equal to each other, but it is not a limitation to an embodiment of the present invention. As can be seen from FIG. 2, the first inclination angle $\theta 1$ of the first camera 21 with respect to the connection line O1O2 and a first included angle $\alpha 1$ of the first optical axis A1 of the first camera 21 with respect to the connection line O1O2 are complementary angles to each other, while the second inclination angle $\theta 2$ of the second camera 22 with respect to the connection line O1O2 and a second included angle $\alpha 2$ of the second optical axis A2 with respect to the connection line O1O2 are complementary angles to each other, which are: $\alpha 1 + \theta 1 = 90°$, $\alpha 2 + \theta 2 = 90°$.

Thus, the first camera 21 and the second camera 22 are disposed obliquely with respect to the connection line O1O2, that is, at least one of the first included angle $\alpha 1$ and the second included angle $\alpha 2$ is not 90°, and FIG. 2 only shows one case.

Exemplarily, the first inclination angle $\theta 1$ is equal to the second inclination angle $\theta 2$, that is, the first included angle α1 is equal to the second included angle α2, and FIG. 2 shows a case where the angles are equal.

Of course, it should be noted by those ordinarily skilled in the art that, the inclination angle of the first camera 21 with respect to the connection line O1O2 may not be equal to the inclination angle of the second camera 22 with respect to the connection line O1O2, but the two may be slightly different; or, one of the first camera 21 and the second camera 22 may be inclined and the other may be not inclined. However, the ranging accuracy may be affected in a case where the inclination angles of the two are not equal, those skilled in the art may choose to make the two equal or unequal as actually required, which will not be limited by embodiments of the present invention.

Exemplarily, the first camera 21 and the second camera 22 are symmetrical with respect to an axis PS passing through a midpoint of the connection line O1O2 between the lens center O1 of the first camera 21 and the lens center O2 of the second camera 22 and being perpendicular to the connection line O1O2.

Exemplarily, the first included angle α1 and the second included angle α2 are larger than or equal to 70° and less than or equal to 90°.

Figure 10:
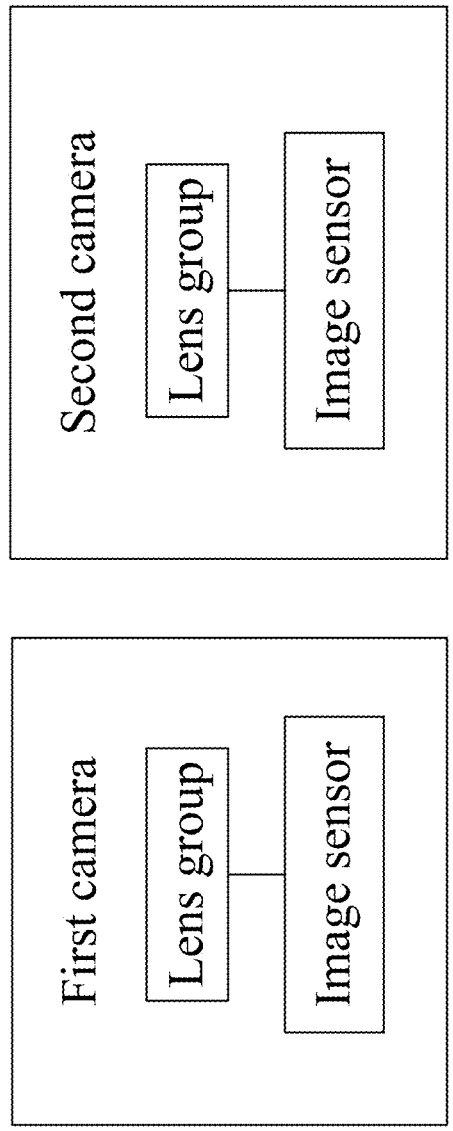
FIG. 10 shows an exemplary structural block diagram of a first camera or a second camera according to an embodiment of the present invention.
Figure 11:
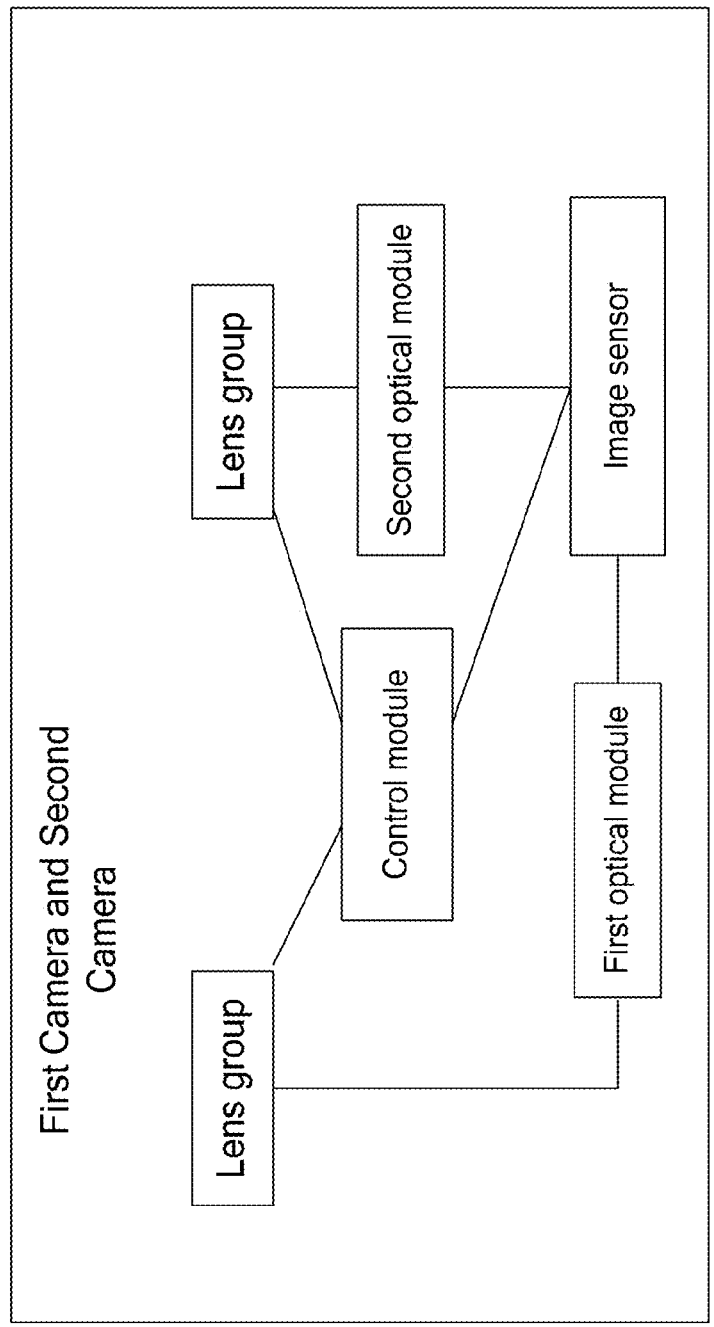
FIG. 11 shows another exemplary structural block diagram of a first camera or a second camera according to the embodiment of the present invention.

For example, the first camera and the second camera may respectively include a lens group and an image sensor, (e.g., a CCD or CMOS sensor), as shown in FIG. 10. Further, a connector is included to be configured for signal connection with a terminal apparatus using the three-dimensional camera. Alternatively, the first camera and the second camera may share an image sensor. Exemplarily, as shown in FIG. 11, when the image sensor is shared, the three-dimensional camera assembly further comprises: a first optical module, configured to guide light from one lens group to the image sensor; a second optical module, configured to guide light from the other lens group to the same image sensor; and a control module, configured to control one lens group and the other lens group to operate alternately, such that the image sensor receives light from one lens group which is transmitted by the first optical module when the one lens group operates, and receives light from the other lens group which is transmitted by the second optical module when the other lens group operates.

The lens groups of the two cameras may be implemented by any micro-lens made of glass or plastic. Exemplarily, the first and second cameras may further be cameras provided with a red filter.

Exemplarily, the first camera and the second camera may respectively include a digital signal processor, or may share one digital signal processor, for processing image information of the two cameras. The digital signal processor may be implemented by a general computing device or a special computing device (e.g. DSP).

Hereinafter, connection manners and fixation manners of the first camera and the second camera with respect to the substrate in the three-dimensional camera assembly will be described.

A First Example

The substrate 31 may be a printed circuit board (PCB) or a flexible circuit board. Thus, a side surface provided with the first camera and the second camera of the substrate 31 may be parallel with the connection line O1O2; the first camera and the second camera are disposed obliquely with respect to the connection line O1O2, that is, the first camera and the second camera are disposed obliquely with respect to the substrate 31; and because the side surface of the substrate is parallel to the connection line O1O2, the inclination angle of each camera with respect to the connection line O1O2 is equal to the inclination angle thereof with respect to the substrate 31.

Exemplarily, in order to make the cameras to be disposed obliquely, a loading stage may be provided between the first and second cameras and the substrate 31, the loading stage is directly disposed on the substrate 31, and the first camera and the second camera are disposed on the loading stage, wherein a side surface provided with the first camera and a side surface provided with the second camera of the loading stage are oblique with respect to the substrate 31. Furthermore, the side surface provided with the first camera and the side surface provided with the second camera of the loading stage may be, for example, symmetrical with respect to the axis PS passing through the midpoint of the connection line O1O2 between the lens center O1 of the first camera 21 and the lens center O2 of the second camera 22 and being perpendicular to the connection line O1O2.

Figure 3:
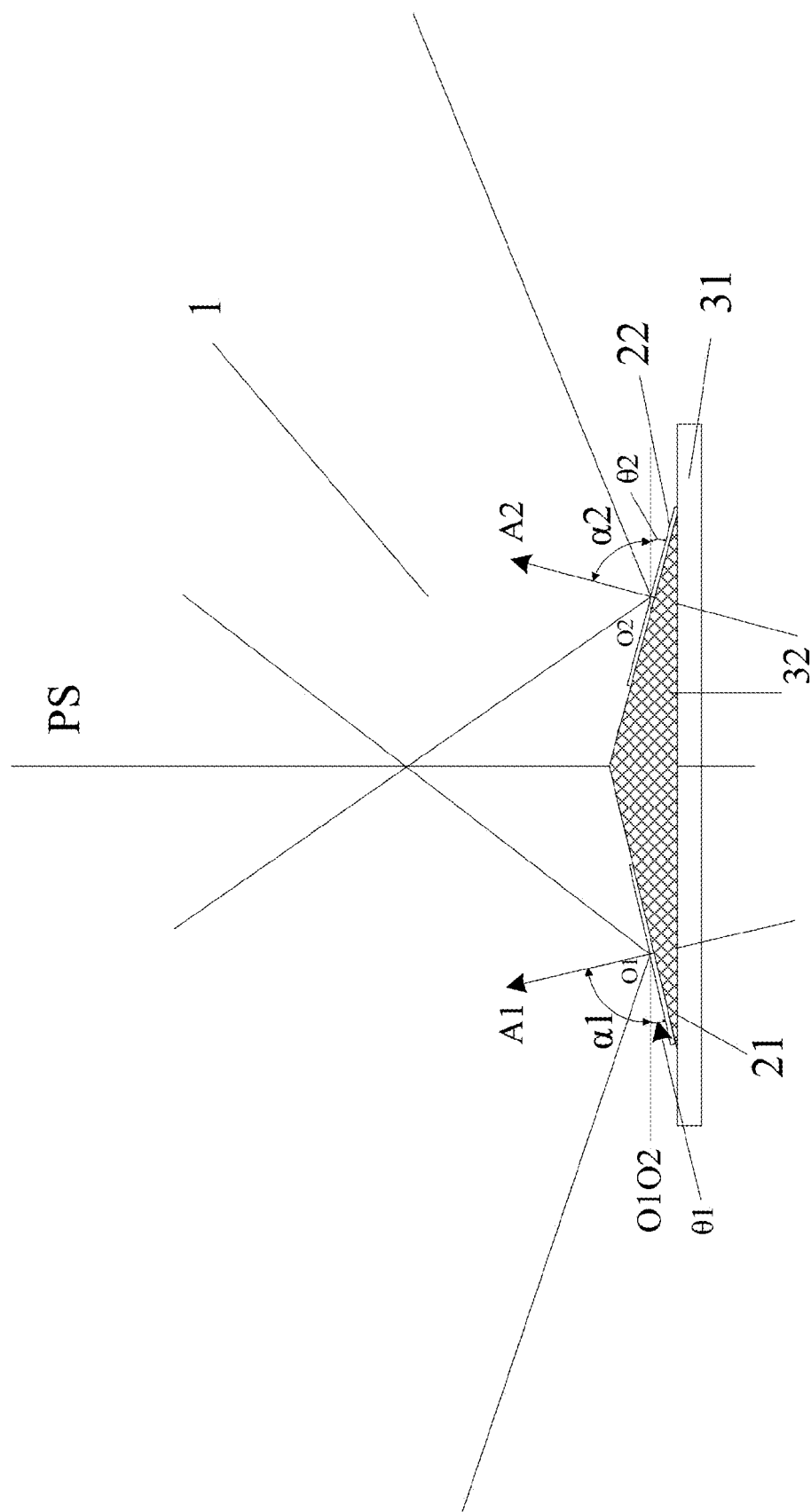
FIG. 3 shows a structural schematic diagram of another three-dimensional camera assembly according to an embodiment of the present invention.

Exemplarily, FIG. 3 shows a structural diagram of an example of a three-dimensional camera assembly according to an embodiment of the present invention; as shown in FIG. 3, a loading stage 32 is disposed between the two cameras and the substrate 31, and the sides surface provided with the two cameras are oblique with respect to the substrate 31, and are symmetrical with respect to the axis PS, moreover, an inclination angle of the side surface provided with the camera of the loading stage 32 with respect to the substrate 31 is equal to an inclination angle of the corresponding camera with respect to the connection line O1O2. On the other hand, if the two may not be strictly equal but are slightly different due to the process deviation, these deviations are within a range of allowable errors.

Figure 4:
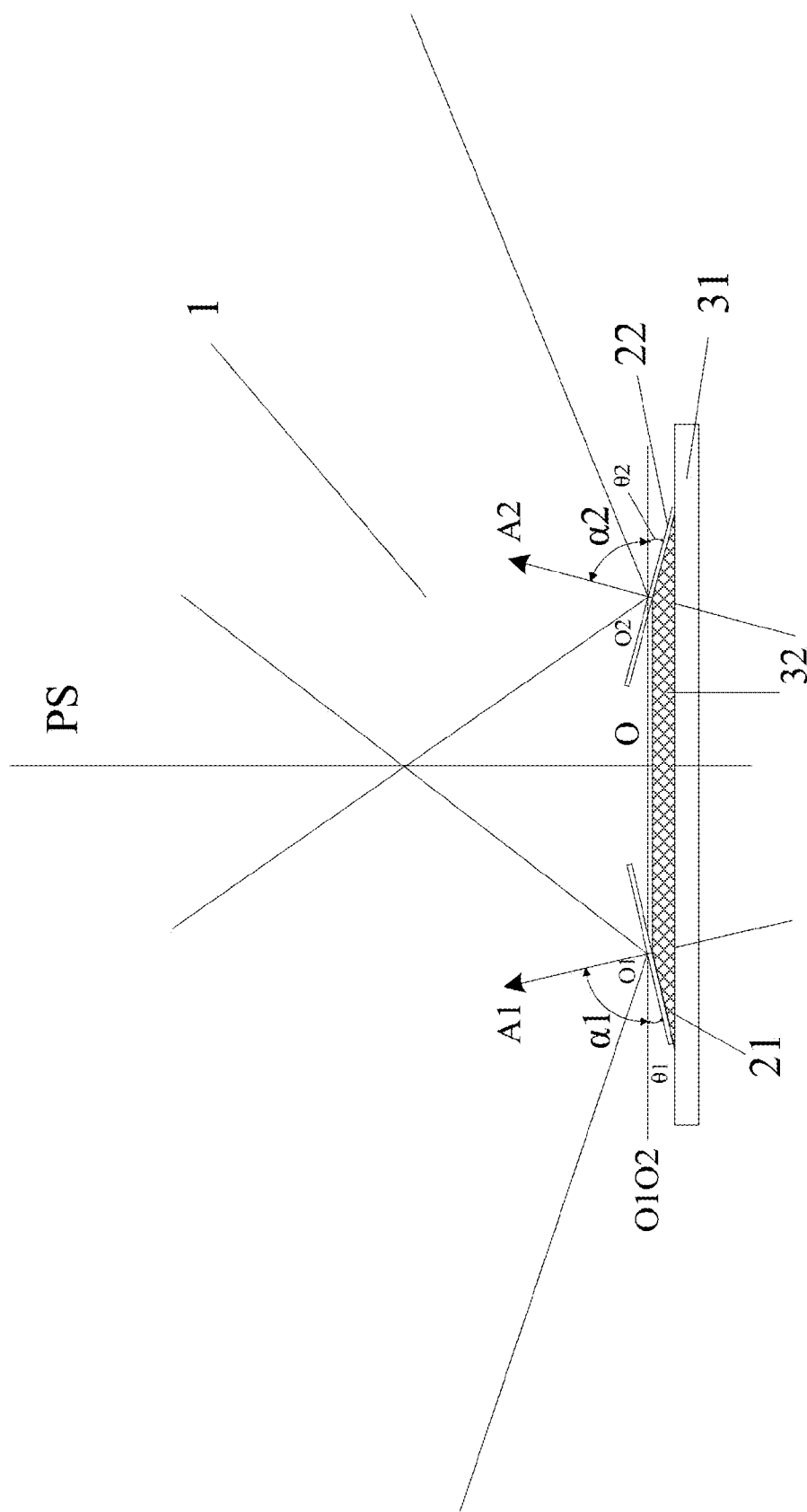
FIG. 4 shows a structural schematic diagram of still another three-dimensional camera assembly according to an embodiment of the present invention.

Exemplarily, a cross section of the loading stage 32 may be an isosceles triangle, as shown in FIG. 3, or may be an isosceles trapezoid, as shown in FIG. 4, which, however, will not be limited by an embodiment of the present invention, as long as the loading stage can dispose the first camera and the second camera, for example, to make the inclination angles of with respect to the connection line O1O2, i.e., the substrate 31, equal to each other.

Exemplarily, in the embodiment of the present invention, two loading stages 321 and 322 may be respectively disposed between the first and second cameras and the substrate 31, for example, cross sections of the two loading stages may be an isosceles right triangle, or an isosceles trapezoid, etc., the side surfaces provided with the cameras of the two loading stages are oblique with respect to the substrate 31, and may be symmetrical with respect to the axis PS, and the inclination angles with respect to the substrate 31 are equal. For example, in order to improve stability of the cameras, there may be an interval between the two loading stages, or there may be no interval, which will not be limited by the embodiment of the present invention.

Here, the loading stage may be made of an insulating material having a supporting function, and the camera may be fixed onto the loading stage in various manners. For example, the loading stage may be provided with a mounting groove, whose inner wall may be provided with a thread; and each camera may accommodate the lens group, the image sensor and/or the connector in a housing, whose outer wall may be provided with a thread, in order to engage and fix the camera through the threads. Alternatively, a mounting hole may be formed in the loading stage, and the camera is fixed to the loading stage by a rivet, a bolt, etc.

Further, for example, a through hole may be formed in the loading stage, through which the connector of the camera is electrically connected to the printed circuit board or the flexible circuit board.

Exemplarily, the camera may be disposed obliquely on the substrate 31 by a rigid support member with a bend at a thin end. For example, the camera is fixed onto the rigid support member by using common manners such as a bolt and a rivet, an end of the rigid support member with the bend is fixed onto the substrate 31, and a bent angle of the bend may be equal to the inclination angle of the camera with respect to the connection line O1O2.

In the embodiment of the present invention, the camera may be disposed obliquely on the substrate 31, e.g., the printed circuit board or the flexible circuit board, in a manner known by the inventor, as long as the camera can be firmly disposed obliquely, and the connection manner will not be limited by the embodiment of the present invention.

A Second Example

The first camera 21 and the second camera 22 may be respectively disposed on two printed circuit boards, each printed circuit board may be disposed obliquely on the substrate 31, and the camera may be disposed obliquely with respect to the substrate 31 by disposing the printed circuit board obliquely.

Figure 5:
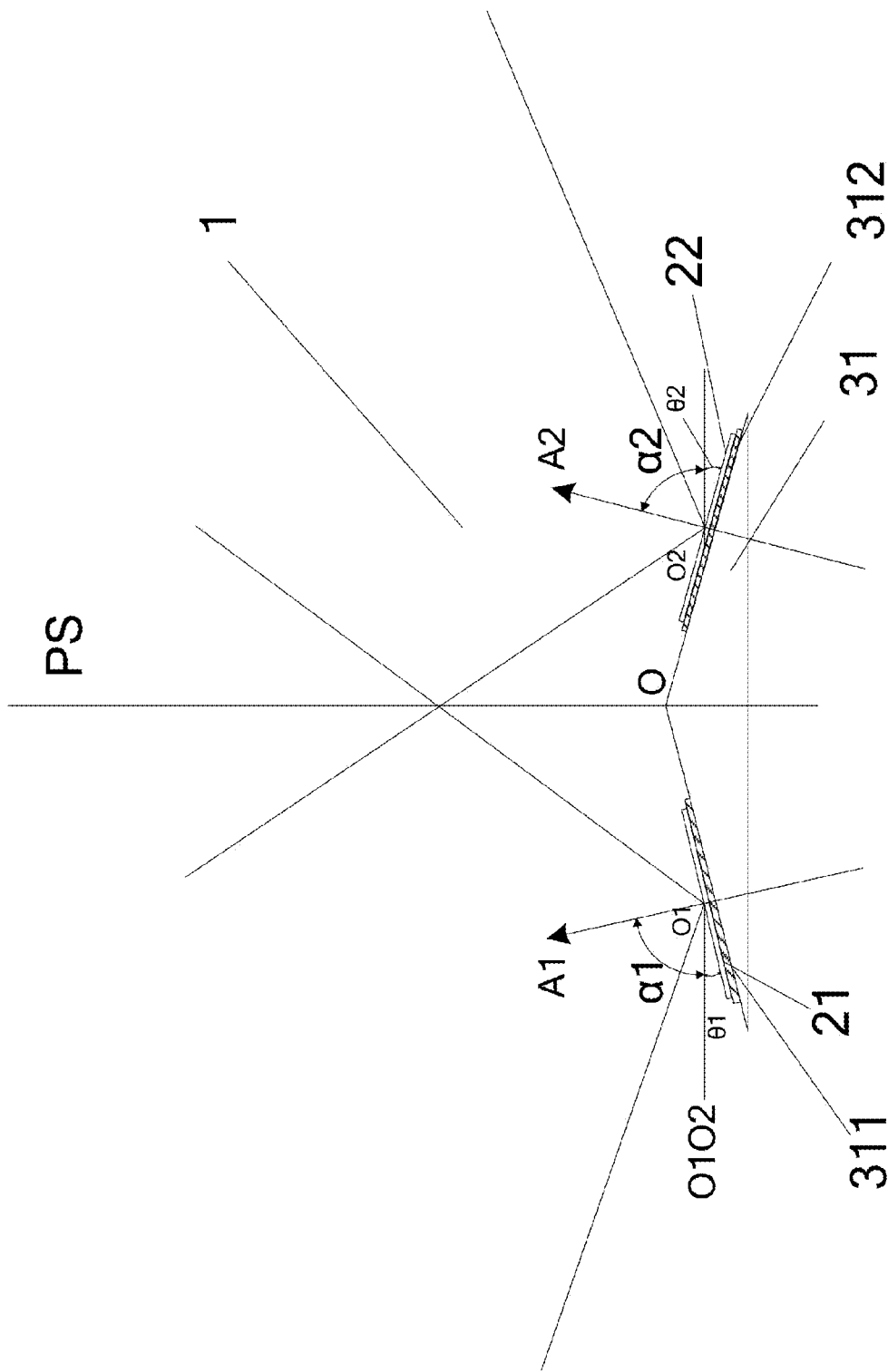
FIG. 5 shows a structural schematic diagram of still another three-dimensional camera assembly according to an embodiment of the present invention.

Exemplarily, the side provided with the first camera 21 and the side provided with the second camera 22 of the substrate 31 may have two slopes formed thereon, and the two slopes may be symmetrical with respect to the axis PS, and a slope angle of each slope is equal to the inclination angle of one of the two cameras with respect to the connection line O1O2. Of course, within a range of allowable error, the slope angle of the slope may be slightly different from the inclination angle of the camera, and these are within the protection scope of the embodiment of the present invention. As shown in FIG. 5, the substrate 31 have two slopes 311 and 312 formed thereon, which are disposed symmetrically with respect to the axis PS.

Exemplarily, a cross section of the substrate 31 having slopes may be an isosceles triangle or an isosceles trapezoid, which will not be limited by the embodiment of the present invention.

In addition, a loading stage, or two loading stages may be disposed between the substrate 31 and the two printed circuit boards of the first camera 21 and the second camera 22. Here, the loading stage of the first example is also applicable to the second example, and thus, a specific structure of the loading stage will not be repeated here.

For a fixation manner, the two printed circuit boards and the loading stage may be connected by riveting, welding, bolting, etc., which will not be limited by the embodiment of the present invention, as long as the printed circuit board can be fixedly connected.

Hereinbefore, only the connection and fixation manners are described in a case where the inclination angles of the first camera and the second camera with respect to the connection line O1O2 are equal, but it is easy for those skilled in the art to conceive that the above-described manners are also applicable in a case where the inclination angles are not equal; however, it is slightly different that, for example, in the case where the inclination angles are not equal for the loading stage, the inclination angle of the side surface provided with the camera corresponds to the inclination angle of the camera with respect to the substrate, so the inclination angles of the side surfaces provided with the cameras with respect to the substrate are different from each other, and other connection and fixation manners are also similar, which will not be repeated for simplicity.

In the three-dimensional camera assembly according to the embodiment of the present invention, the two cameras are disposed obliquely with respect to the connection line between the lens centers of the two cameras, so that a parallax between images of the same object formed in the two cameras can be enlarged, and thereby, the ranging accuracy for a distant object can be enhanced. Furthermore, for the three-dimensional camera assembly according to the embodiment of the present invention, in a case where a distance between the two cameras is kept as being small, the ranging accuracy for the distant object can be enhanced, such that the ranging accuracy can be improved while the a size of the three-dimensional camera assembly is not increased, which is favorable for achieving a miniaturized and ultra-thin terminal three-dimensional camera assembly and a miniaturized and ultra-thin terminal apparatus accommodating the three-dimensional camera assembly and can enhance portability. Further, the two cameras in the three-dimensional camera assembly may have completely the same inclination angle, so that the ranging accuracy for the distant object can be further enhanced, which is more favorable for achieving a miniaturized and ultra-thin terminal three-dimensional camera assembly and a miniaturized and ultra-thin terminal apparatus accommodating the three-dimensional camera assembly and can further enhance portability.

It should be noted by those skilled in the art that, in the embodiment of the present invention, the first camera 21 and the second camera 22 may be cameras of the same specification, for example, having the same resolution, horizontal and vertical field angles FOV($\alpha$, $\beta$), focal distance, etc. For example, for a binocular vision ranging technology, those skilled in the art may select an appropriate camera according to actual situations and empirical values. For example, a camera with a resolution of 1280*720, horizontal and vertical field angles FOV($\alpha$, $\beta$) of FOV(75, 60), and a focal distance of 2.4 mm may be used, and the two cameras are spaced by 12 cm.

Of course, in the embodiment of the present invention, the first camera 21 and the second camera 22 may be different, for example, the resolution, the horizontal and vertical field angles FOV ($\alpha$, $\beta$) or the focal distance are different, which those skilled in the art may select based on the actual situation, and will not be limited by the embodiment of the present invention.

Figure 6B:
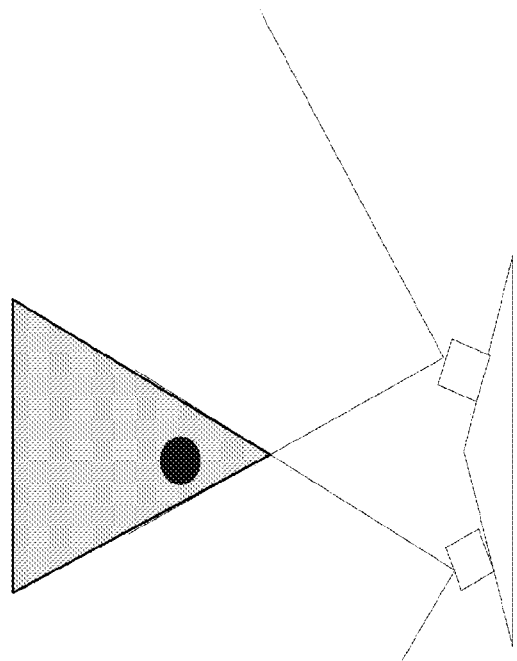
FIG. 6 (a) and FIG. 6 (b) respectively show comparison views of an effective viewing angles in two cases where the camera is not disposed obliquely and where the camera is disposed obliquely.
Figure 6A:
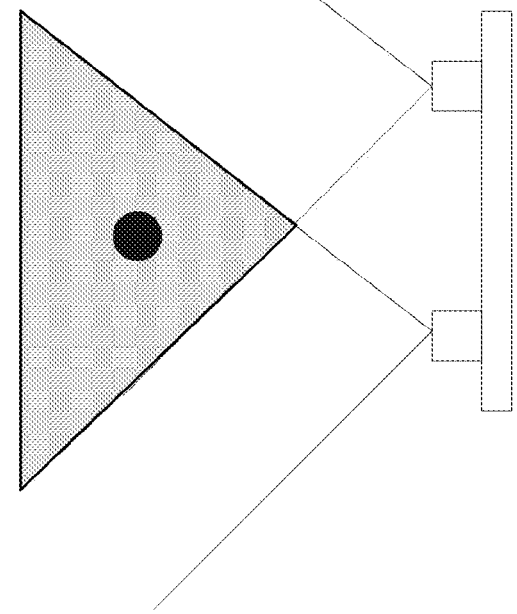

Further, for the three-dimensional camera assembly according to the embodiment of the present invention, since the camera is disposed obliquely, as compared with a case where the camera is not disposed obliquely, the effective viewing angle may be reduced. As shown in FIG. 6(a) and FIG. 6(b), FIG. 6(a) and FIG. 6(b) respectively show comparison views of the effective viewing angles in two cases where the camera is not disposed obliquely and where the camera is disposed obliquely, wherein shadow regions are regions of the effective viewing angles, and it can be seen from FIG. 6(a) and FIG. 6(b) that, as compared with the case where the camera is not disposed obliquely, the effective viewing angle of the three-dimensional camera assembly in which the camera is disposed obliquely is significantly reduced.

Figure 7:
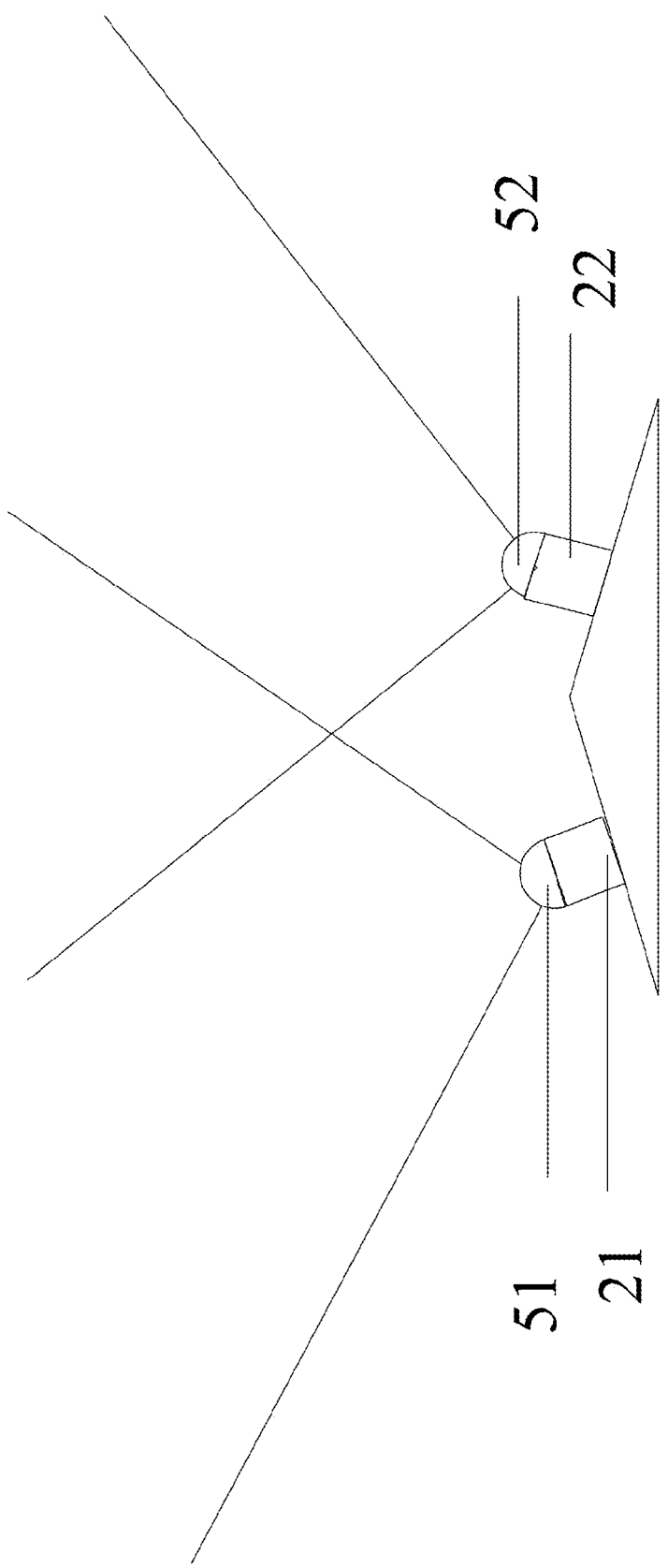
FIG. 7 shows a structural schematic diagram of still another three-dimensional camera assembly according to an embodiment of the present invention.

In order to compensate for the loss of the effective viewing angle brought about by the oblique arrangement of the camera, the camera according to the embodiment of the present invention is further provided with a viewing angle compensation lens unit, as shown in FIG. 7, each of two viewing angle compensation lens units 51 and 52 is located between the lens group and the image sensor of the camera, and may be a lens group that can enlarge the viewing angle, for example, the viewing angle compensation lens units may be the lens group having an amplifying function, so as to compensate for the loss of the viewing angle, which will not be limited by the embodiment of the present invention, as long as the effective viewing angle can be increased.

Thus, for the three-dimensional camera assembly provided with the viewing angle compensation lens unit, while the effective viewing angle is not reduced, the ranging accuracy for the distant object can be enhanced.

Figure 8:
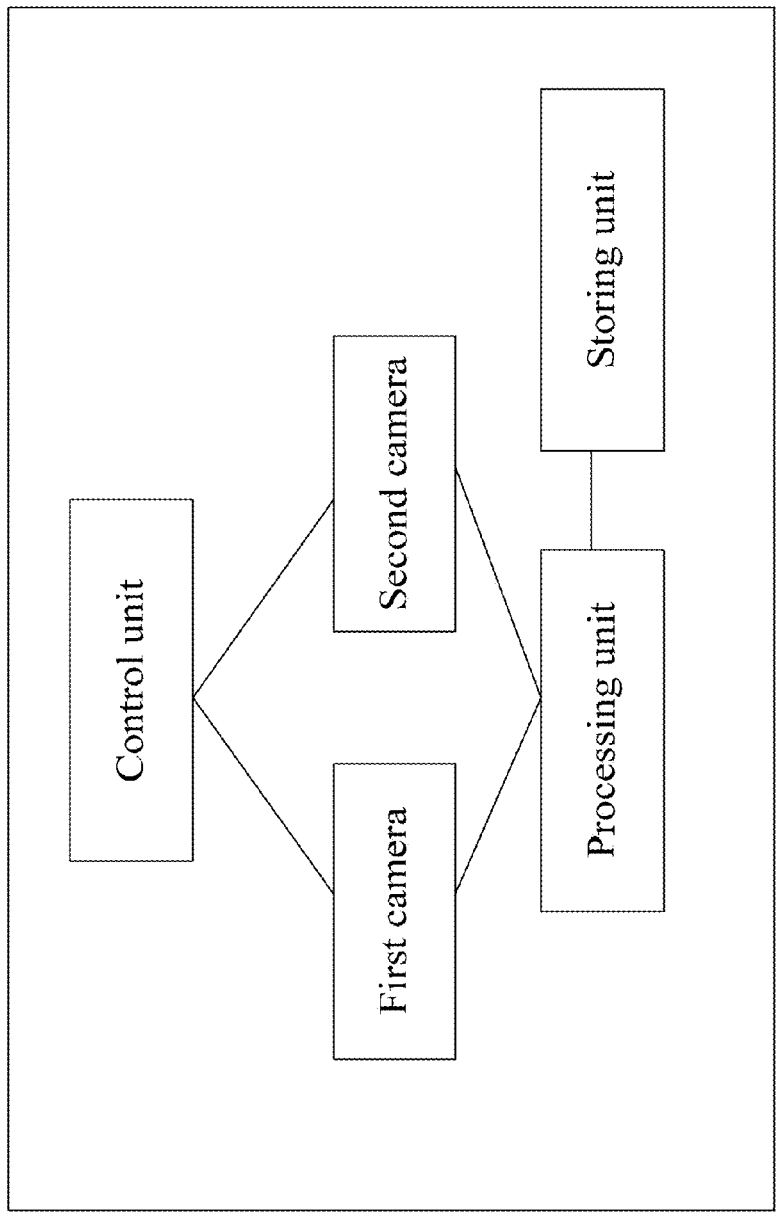
FIG. 8 shows an exemplary structural block diagram of a three-dimensional camera assembly according to an embodiment of the present invention.

Exemplarily, the three-dimensional camera assembly according to the embodiment of the present invention may further comprise: a storing unit, for storing image information picked up by the first camera and the second camera; a processing unit, for processing the image information; a control unit, for controlling shooting actions of the first camera and the second camera, as shown in FIG. 8. The storing unit, the processing unit or the control unit may be implemented by the existing technology, which will not be repeated here.

In addition, an embodiment of the present invention further provides a ranging method, and particularly a ranging method using any of the above-described three-dimensional camera assemblies. The ranging method according to the embodiment of the present invention, comprises:

Step S1: capturing images of an object to be ranged by using a first image pickup device and a second image pickup device, respectively; and Step S2: determining a vertical distance h from the object to be ranged to a connection line between a lens center of a camera of the first image pickup device and a lens center of a camera of the second image pickup device, according to a coordinate difference Δx or Δy between a first image point and a second image point of the object to be ranged formed in the first image pickup device and the second image pickup device, wherein the first image pickup device and the second image pickup device face the same direction, and a first optical axis of the first image pickup device and a second optical axis of the second image pickup device are oblique with respect to the connection line between the lens center of the first image pickup device and the lens center of the second image pickup device, the first optical axis has a first included angle with respect to the connection line, and the second optical axis has a second included angle with respect to the connection line, and at least one of the first included angle and the second included angle is not equal to 90°.

Exemplarily, the determining the vertical distance h from the object to be ranged to the connection line between a lens center of the first image pickup device and a lens center of the second image pickup device, according to the coordinate difference Δx or Δy between the first image point and the second image point of the object to be ranged formed in the first image pickup device and the second image pickup device, includes: determining the distance h by formula of $$h = \frac{d*f}{(x_L - x_R)*\cos\theta} - f = \frac{d*f}{\Delta x*\cos\theta} - f \text{ or}$$

$$h = \frac{d*f}{(y_L - y_R)*\cos\theta} - f = \frac{d*f}{\Delta y*\cos\theta} - f,$$

where $x_L$ and $y_L$ are a horizontal coordinate and a vertical coordinate of the first image point, $x_R$ and $y_R$ are a horizontal coordinate and a vertical coordinate of the second image point, d is a distance between the lens center of the first image pickup device and the lens center of the second image pickup device, f is a focal distance of the first image pickup device and the second image pickup device, θ is a complementary angle of the first included angle, the first included angle is equal to the second included angle, and the first image pickup device and the second image pickup device are completely identical.

Exemplarily, in the embodiment of the present invention, the image pickup device may be any device having the image pickup function, such as a digital camera, a camera, and a camcorder and so on.

Exemplarily, the ranging method may be performed by using the three-dimensional camera assembly according to an embodiment of the present invention. Hereinafter, the ranging method according to an embodiment of the present invention will be described in detail in conjunction with FIG. 9.

Here, it should be noted that the ranging method are described below with the three-dimensional camera assembly according to the embodiment of the present invention as an example, and actually, other image pickup device may also be used hereinafter.

Figure 9:
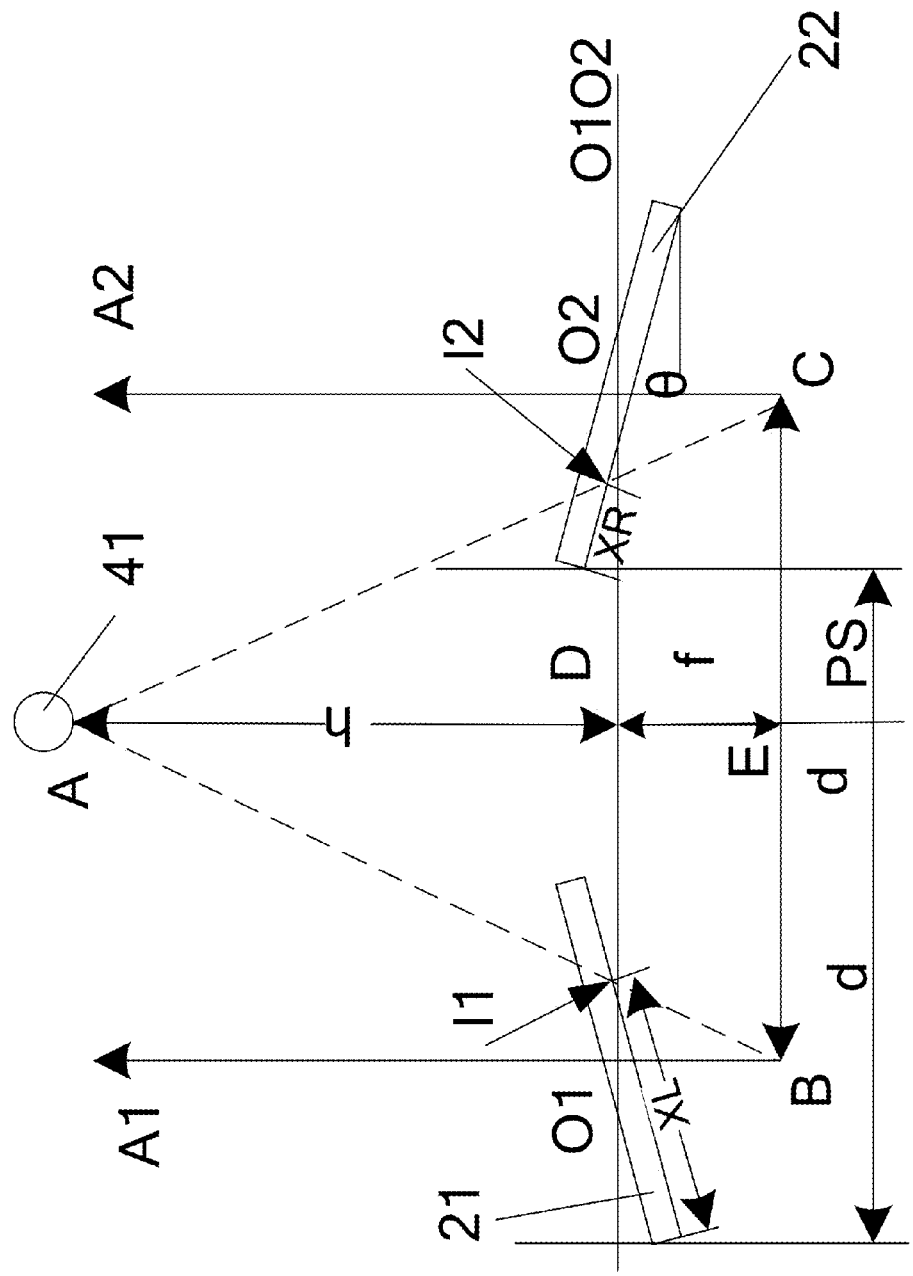
FIG. 9 shows a principle diagram of a ranging method according to an embodiment of the present invention.

As shown in FIG. 9, a first camera 21 and a second camera 22 are disposed obliquely with respect to a connection line O1O2 of lens centers of the two cameras and are disposed symmetrically with respect to an axis PS passing through a midpoint of the connection line O1O2 and being perpendicular thereto, that is, the first camera 21 and the second camera 22 have the same inclination angle θ≠0 with respect to the connection line O1O2, and the first camera 21 and the second camera 22 are identical cameras, having the same focal distance f. Further, a vertical distance from an object to be ranged 41 to the connection line between the lens centers of the two cameras is h, an optical axis of the first camera 21 is A1, an optical axis of the second camera is A2, a first image point of the object to be ranged 41 on the first camera 21 is I1 ($x_L$, $y_L$), a second image point on the second camera 22 is I2 ($x_R$, $y_R$). Here, $x_L$ and $y_L$ are respectively a horizontal coordinate and a vertical coordinate of the image point I1, $x_R$ and $y_R$ are respectively a horizontal coordinate and a vertical coordinate of the image point I2, $x_L$, $y_L$, $x_R$ and $y_R$, for example, take the pixel number as a unit.

Here, it should be noted that because the inclination angles of the first camera and the second camera are relatively small, and further f to facilitate simplified calculation, the optical axes of the first camera 21 and the second camera 22 are approximately parallel to a line perpendicular to the connection line of the lens centers of two cameras; the horizontal coordinate $x_L$ and the vertical coordinate $y_L$ of the first image point are determined by taking a leftmost point of the first camera 21 as an origin of coordinate and taking a line being parallel to the first camera 21 as a x axis and a line being perpendicular to the first camera 21 as a y axis; the horizontal coordinate $x_R$ and the vertical coordinate $y_R$ of the second image point are determined by taking a leftmost point of the second camera 22 as an origin of coordinate and taking a line being parallel to the second camera 22 as a x axis and a line being perpendicular to the second camera 22 as a y axis.

Further, it should be noted that the object to be ranged 41 may be considered as one point, the first image point on the first camera and the second image point on the second camera are images of the object 41 formed on the image sensors of the two cameras, and in FIG. 9, for simplification, the first image point and the second image point are shown on the two cameras.

Exemplarily, in the embodiment of the present invention, step S2 includes: calculating the distance h by formula of $$h = \frac{d*f}{(x_L - x_R)*\cos\theta} - f = \frac{d*f}{\Delta x*\cos\theta} - f \text{ or}$$

$$h = \frac{d*f}{(y_L - y_R)*\cos\theta} - f = \frac{d*f}{\Delta y*\cos\theta} - f,$$

where d is a distance between the first camera 21 and the second camera 22.

If it is assumed that the two cameras are located in the same horizontal plane, then a parallax between the first image point I1 and the second image point I2 in the y direction, i.e., in the vertical direction, $\Delta y=y_L-y_R$ is 0, there is only a parallax $\Delta x=x_L-x_R$ between the two in the x direction, i.e., in the horizontal direction. Further, as shown in FIG. 9, a triangle AI1I2 and a triangle ABC are approximate to each other, and here it should also be noted that, since the inclination angle of the camera is relatively small, to facilitate simplified calculation, in the embodiment of the present invention, the first optical axis A1 of the first camera 21 and the second optical axis A2 of the second camera A2 are approximated to be parallel to the axis PS perpendicular to the connection line O1O2, and the focal distance f of the camera is a distance on the axis PS.

Thus, the following can be derived according to the triangle similarity theory:

$$\frac{BC}{AE} = \frac{I1I2}{AD} \qquad \text{Formula (1)}$$

As can be seen from FIG. 9, BC=d, AD=h, AE=h+f. In addition, for I1I2, as can be seen from FIG. 9, the distance between the cameras is d, then, the distance between the leftmost edges of the cameras is also d, then I1I2=d+$x_R$*cos θ-$x_L$*cos θ.

Next, the respective quantities described above are introduced into Formula (1), and the following may be derived:

$$\frac{d}{h+f} = \frac{(d + x_R*\cos\theta) - x_L*\cos\theta}{h} \qquad \text{Formula (2)}$$

By Formula (2), the vertical distance h from the object to be ranged 41 to the connection line between the lens center of the first camera and the lens center of the second camera can be calculated.

$$h = \frac{d*f}{(x_L - x_R)*\cos\theta} - f = \frac{d*f}{\Delta x*\cos\theta} - f \qquad \text{Formula (3)}$$

Exemplarily, if it is assumed that the two cameras are arranged on the same vertical line, then the first image point I1 and the second image point I2 have a parallax $\Delta y=y_L-y_R$ only in the y direction, which is the same as the case where a parallax in the x direction is known, the vertical distance h to the connection line between the lens center of the first camera and the lens center of the second camera may be calculated by Formula (4).

$$h = \frac{d*f}{(y_L - y_R)*\cos\theta} - f = \frac{d*f}{\Delta y*\cos\theta} - f \qquad \text{Formula (4)}$$

Further, for comparison, consistent with a principle by which the distance h is obtained according to the parallax, when the cameras according to the embodiment of the present invention are disposed obliquely, the distance h may be calculated by Formula (5) when the cameras are not disposed obliquely.

$$h = \frac{d*f}{(x_L - x_R)} - f = \frac{d*f}{\Delta x} - f \qquad \text{Formula (5)}$$

By comparing Formula (5) and Formula (3), it can be seen that, in a case where d and f are identical, if the cameras are disposed obliquely, that is, have the inclination angle θ, the same parallax represents a larger distance, so that a detection range is increased. This also means that: the same dual-camera distance can detect a larger distance.

Here, a detection accuracy refers to a distance value represented by Δx added by 1. It can be seen from the above that, for the same object to be ranged, i.e., in a case where h is identical, $$\frac{d*f}{\Delta x_\theta * \cos\theta_\theta} = \frac{d*f}{\Delta x_0} \rightarrow \Delta x_\theta * \cos\theta_\theta = \Delta x_0 \rightarrow \Delta x_\theta > \Delta x_0$$

where $\Delta x_\theta$ is a parallax in the x direction when the inclination angle of the camera is θ, $\Delta x_0$ is a parallax in the x direction when the camera is not disposed obliquely. It can be seen from the above that, Δx is larger in a case where there is the inclination angle, which means that it is easier to be identified by the image sensor, e.g., a CMOS or a CCD, so that the ranging accuracy is higher.

It should be noted that the inclination angles of the first camera 21 and the second camera 22 with respect to the connection line O1O2 may not be equal, and herein for convenience of description, only a case where the inclination angles are identical is shown.

In the ranging method using any of the above-described three-dimensional camera assemblies according to the embodiment of the present invention, the two cameras are disposed obliquely with respect to the connection line between the lens centers of the two cameras, so that the parallax between the images of the same object formed in the two cameras can be enlarged, and thereby, the ranging accuracy for the distant object can be enhanced.

Further, an embodiment of the present invention further provides a terminal apparatus, comprising any of the above-described three-dimensional camera assemblies according to the embodiment of the present invention.

The terminal apparatus according to an embodiment of the present invention further comprises: a housing, wherein the three-dimensional camera assembly is disposed inside or outside the housing.

For example, in the case where the three-dimensional camera assembly is disposed inside the housing, a camera hole is provided in the housing, through which two cameras of the three-dimensional camera assembly are exposed to the outside; there may be one camera hole, which simultaneously exposes the two cameras, or there may be two camera holes, which expose the two cameras, respectively. Further, the three-dimensional camera assembly may share a substrate with the terminal apparatus. For example, the substrate of the three-dimensional camera assembly may be a printed circuit board of the terminal apparatus which has a drive circuit mounted thereon. Alternatively, the substrate of the three-dimensional camera may be fixed onto a supporter inside the housing of the terminal apparatus by bolting, riveting, etc. For example, when the terminal apparatus is a liquid crystal display or an organic electroluminescent display, the substrate of the three-dimensional camera assembly is just the printed circuit board having a gate drive circuit and/or a data line drive circuit mounted thereon, or, the substrate is fixed onto the printed circuit board having the gate drive circuit and/or the data line drive circuit mounted thereon.

For example, in the case where the three-dimensional camera assembly is disposed outside the housing, the three-dimensional camera assembly further includes a housing, in which the lens group, the image sensor, the digital signal processor and the like of the three-dimensional camera are accommodated, and the three-dimensional camera assembly is connected to a main control circuit of the terminal apparatus by wires, USB interfaces, serial interfaces or parallel interfaces. For example, the apparatus further comprises an output device such as a display screen.

Exemplarily, the terminal apparatus according to the embodiment of the present invention may be a tablet personal computer, a smart phone, a laptop, a desktop, a navigator, etc.; of course, the three-dimensional camera assembly according to the embodiment of the present invention may be further applied to other terminal apparatuses, which will not be limited by the embodiment of the present invention.

Further, it should be noted that in embodiments of the present invention, only by taking a two viewing point three-dimensional camera assembly comprising two cameras, a terminal apparatus and a ranging method using two cameras as an example, the technical solution of embodiments of the present invention may also applied to the multi-viewing-point three-dimensional camera assembly comprising more than two cameras, a terminal apparatus and a ranging method using more than two cameras, for example, wherein a part of the cameras is(are) oblique and the other is(are) not oblique, or all of the cameras are oblique, which will not be limited by the embodiment of the present invention. Further, it should be noted that the optical axis of the camera in an embodiment of the present invention refers to a main optical axis, and a connection line between lens centers of coaxal lenses comprised in a lens group of the camera.

In the terminal apparatus comprising the above-described three-dimensional camera assemblies according to an embodiments of the present invention, the two cameras are disposed obliquely with respect to the connection line between the lens centers of the two cameras, so that the parallax between the images of the same object formed in the two cameras can be enlarged, and thereby, the ranging accuracy for the distant object can be enhanced. Furthermore, in a case where a size of the three-dimensional camera assembly is not increased, the ranging accuracy can be improved and which is favorable for achieving a miniaturized and ultra-thin terminal apparatus and can enhance portability.

The foregoing embodiments merely are exemplary embodiments of the present invention, and not intended to define the scope of the present invention, and the scope of the present invention is determined by the appended claims.

What is claimed is:

1. A ranging method, comprising:
capturing images of an object to be ranged by using a first image pickup device and a second image pickup device, respectively; and
determining a vertical distance h from the object to be ranged to a connection line between a lens center of the first image pickup device and a lens center of the second image pickup device, according to a coordinate difference Δx or Δy between a first image point and a second image point of the object to be ranged formed in the first image pickup device and the second image pickup device,
wherein the first image pickup device and the second image pickup device face the same direction, and a first optical axis of the first image pickup device and a second optical axis of the second image pickup device are oblique with respect to the connection line between the lens center of the first image pickup device and the lens center of the second image pickup device, the first optical axis has a first constant included angle with respect to the connection line, and the second optical axis has a second constant included angle with respect to the connection line, and at least one of the first included angle and the second included angle is not 90°, and
wherein the determining the vertical distance h from the object to be ranged to the connection line between the lens center of the first image pickup device and the lens center of the second image pickup device, according to the coordinate difference Δx or Δy between the first image point and the second image point of the object to be ranged formed in the first image pickup device and the second image pickup device, includes:
determining the distance h by a formula of $$h = \frac{d*f}{(x_L - x_R)*\cos\theta} - f = \frac{d*f}{\Delta x*\cos\theta} - f \text{ or}$$

$$h = \frac{d*f}{(y_L - y_R)*\cos\theta} - f = \frac{d*f}{\Delta y*\cos\theta} - f,$$

where $x_L$ and $y_L$ are a horizontal coordinate and a vertical coordinate of the first image point, $x_R$ and $y_R$ are a horizontal coordinate and a vertical coordinate of the second image point, d is a distance between the lens center of the first image pickup device and the lens center of the second image pickup device, f is a focal distance of the first image pickup device and the second image pickup device, θ is a complementary angle of the first included angle, the first included angle is equal to the second included angle, and the first image pickup device and the second image pickup device are completely identical.

2. A three-dimensional camera assembly applicable for performing the ranging method according to claim 1, comprising:
a substrate;
a first camera, mounted on the substrate and facing a first direction; and
a second camera, mounted on the substrate and facing the first direction,
wherein a first optical axis of the first camera and a second optical axis of the second camera are oblique with respect to a connection line between a lens center of the first camera and a lens center of the second camera, the first optical axis has a first constant included angle with respect to the connection line, the second optical axis has a second constant included angle with respect to the connection line, and at least one of the first included angle and the second included angle is not 90°.

3. The three-dimensional camera assembly according to claim 2, wherein the first included angle is equal to the second included angle.

4. The three-dimensional camera assembly according to claim 3, wherein the first camera and the second camera are disposed symmetrically with respect to an axis passing through a midpoint of the connection line between the lens center of the first camera and the lens center of the second camera and being perpendicular to the connection line.

5. The three-dimensional camera assembly according to claim 3, wherein the first included angle is more than 70° and less than 90°.

6. The three-dimensional camera assembly according to claim 2, wherein the first camera includes: a first lens group and a first image sensor; and
the second camera includes: a second lens group and a second image sensor.

7. The three-dimensional camera assembly according to claim 6, further comprising: a viewing angle compensation lens group, configured to enhance an effective viewing angle of the three-dimensional camera assembly.

8. The three-dimensional camera assembly according to claim 3, further comprising: a loading stage, disposed between the first and second cameras and the substrate,
wherein a surface provided with the first camera and a surface provided with the second camera of the loading stage are oblique with respect to the substrate, and are symmetrical with respect to an axis passing through a midpoint of the connection line between the lens center of the first camera and the lens center of the second camera and being perpendicular to the connection line.

9. The three-dimensional camera assembly according to claim 3, further comprising: two loading stages, respectively disposed between the first camera and the substrate and the second camera and the substrate,
wherein a surface provided with the first camera and a surface provided with the second camera of the two loading stages are oblique with respect to the substrate, and are symmetrical with respect to an axis passing through a midpoint of the connection line between the lens center of the first camera and the lens center of the second camera and being perpendicular to the connection line.

10. The three-dimensional camera assembly according to claim 8, wherein the substrate is a printed circuit board or a flexible circuit board.

11. The three-dimensional camera assembly according to claim 3, further comprising: two printed circuit boards, each being oblique with respect to the substrate,
wherein one printed circuit board is provided with the first camera, and the other printed circuit board is provided with the second camera; and the two printed circuit boards are symmetrical with respect to an axis passing through a midpoint of the connection line between the lens center of the first camera and the lens center of the second camera and being perpendicular to the connection line.

12. The three-dimensional camera assembly according to claim 11, wherein a surface provided with the first and second cameras of the substrate is provided with slopes which are symmetrical with respect to the axis passing through the midpoint of the connection line between the lens center of the first camera and the lens center of the second camera and being perpendicular to the connection line.

13. The three-dimensional camera assembly according to claim 11, further comprising: two loading stages, respectively disposed between the two printed circuit boards and the substrate,
wherein a surface provided with the first camera and a surface provided with the second camera of the two loading stages are oblique with respect to the substrate, and are symmetrical with respect to the axis passing through the midpoint of the connection line between the lens center of the first camera and the lens center of the second camera and being perpendicular to the connection line.

14. The three-dimensional camera assembly according to claim 11, further comprising: a loading stage, disposed between the two printed circuit boards and the substrate,
wherein a surface provided with the first camera and a surface provided with the second camera of the loading stage are oblique with respect to the substrate, and are symmetrical with respect to the axis passing through the midpoint of the connection line between the lens center of the first camera and the lens center of the second camera and being perpendicular to the connection line.

15. The three-dimensional camera assembly according to claim 3, wherein the first camera and the second camera are identical cameras.

16. A terminal apparatus, comprising: the three-dimensional camera assembly according to claim 2.

17. The terminal apparatus according to claim 16, further comprising: a housing, wherein the housing is provided with a camera hole formed therein, the three-dimensional camera assembly is disposed within the housing, and the first camera and the second camera are exposed to the outside through the camera hole.

18. The terminal apparatus according to claim 16, further comprising: a housing, wherein the three-dimensional camera assembly is mounted outside the housing.

* * * * *